(12) United States Patent
Hafuka et al.

(10) Patent No.: US 7,324,174 B2
(45) Date of Patent: Jan. 29, 2008

(54) BACKLIGHT DEVICE AND LIQUID CRYSTAL DISPLAY APPARATUS

(75) Inventors: Tabito Hafuka, Tokyo (JP); Hisakazu Takeuchi, Tokyo (JP); Tatsuya Ode, Tochigi (JP)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 10/595,264

(22) PCT Filed: Jul. 27, 2005

(86) PCT No.: PCT/JP2005/013734

§ 371 (c)(1),
(2), (4) Date: Apr. 3, 2006

(87) PCT Pub. No.: WO2006/013760

PCT Pub. Date: Feb. 9, 2006

(65) Prior Publication Data

US 2007/0103908 A1    May 10, 2007

(30) Foreign Application Priority Data

Aug. 4, 2004   (JP) ............................. 2004-228625

(51) Int. Cl.
*G02F 1/1335* (2006.01)
*F21V 29/00* (2006.01)

(52) U.S. Cl. ............................. 349/61; 349/58; 362/29; 362/97; 362/294; 362/240

(58) Field of Classification Search .................. 349/56, 349/58, 61; 362/29, 97, 240, 294
See application file for complete search history.

(56) References Cited

U.S. PATENT DOCUMENTS

2006/0023448 A1*   2/2006   Mok et al. .................. 362/231

FOREIGN PATENT DOCUMENTS

| JP | 618734 | 11/1994 |
|---|---|---|
| JP | 2002-72901 | 3/2002 |
| JP | 2002-162626 | 6/2002 |
| JP | 2003-124528 | 4/2003 |
| JP | 2005-117023 | 4/2005 |

* cited by examiner

*Primary Examiner*—Frank G. Font
*Assistant Examiner*—Michael P. Mooney
(74) *Attorney, Agent, or Firm*—Sonnenschein Nath & Rosenthal LLP (57) ABSTRACT

Disclosed is a light transmitting liquid crystal display apparatus used with advantage with a television receiver having a large-sized display not less than 30 inch. A backlight section (3) sending out illuminating light is formed by a plural number of rows made up of many light emitting units (15) arranged on the back surface of a liquid crystal display panel (8). Each light emitting unit includes many LED units (18) mounted on an interconnection substrate (17) and is mounted in this state on a heat dissipating plate (28). A reflecting section (6) for reflecting the light radiated from each LED is formed by a large number of reflective sheet pieces (27), assembled from one heat emitting unit to another, and a reflective plate (26) secured to reflecting plate supports (40) formed on the heat dissipating plate.

9 Claims, 6 Drawing Sheets

BACKLIGHT DEVICE AND LIQUID CRYSTAL DISPLAY APPARATUS

TECHNICAL FIELD

This invention relates to a liquid crystal display apparatus, having a light transmitting liquid crystal display (LCD) device, and to a backlight device used for this liquid crystal display apparatus.

The present invention contains subject matter related to Japanese Patent Application JP 2004-228625, filed in the Japanese Patent Office on Aug. 4, 2004, the entire contents of which being incorporated herein by reference.

BACKGROUND ART

As compared to the cathode ray tube (CRT), the liquid crystal display apparatus is enlarged in display size, lighter in weight and lower in power usage, so that it is used for a television receiver or for a variety of display devices, as is a self-light-emitting PDP (plasma display panel), as an example. The liquid crystal display device encloses liquid crystal between two transparent substrates of variable sizes and applies electrical voltage across two electrodes provided to the transparent substrates to change the orientation of the liquid crystal molecules and light transmittivity to make optical display of, for example a preset image.

In the liquid crystal display device, the liquid crystal itself is not light radiating, and hence a light source is provided for causing illuminated light to be incident on the liquid crystal panel. The light source used may be of the side light system in which illuminating light is incident from a lateral side of the back surface of the liquid crystal panel, or of the back light system in which illuminating light is directly incident from the back side of the liquid crystal panel. The backlight unit, configured for supplying the illuminating light from the back side of the liquid crystal panel, includes a light source, a light guide plate guiding the illuminating light radiated from the light source to the liquid crystal panel, a reflective sheet, and a lens sheet or a light diffusing sheet, and is configured for causing the illuminating light, radiated from the light source, to be incident on the entire surface of the panel.

As a light source, used for this sort of the backlight unit, a cold cathode fluorescent lamp (CCLF), having mercury or xenon enclosed in a fluorescent tube, is used. This type of the backlight unit has such defects that it is low in light emitting brightness of the cold cathode fluorescent lamp and is of short useful life, and that a low brightness area may be present on the cathode side such that uniform brightness cannot be maintained.

In a liquid crystal display apparatus of a large display size, an area lit configuration backlight device, provided with plural elongated cold cathode fluorescent lamps on the back surface of a light diffusing plate, is used for illuminating display light on the liquid crystal panel. This area lit configuration backlight device also suffers the problem ascribable to the cold cathode fluorescent lamp and, if the device is used for a large format television receiver, exceeding 30 inches, the problem of insufficient brightness or insufficient uniformity of brightness becomes more prominent.

On the other hand, in the area lit configuration backlight device, there has been proposed an LED area lit configuration backlight, in which larger numbers of light emitting diodes, sometimes abbreviated to LEDs, of three prime colors, namely red, green and blue light emitting diodes, are arrayed two-dimensionally on the back surface side of the light diffusing film to obtain white light. In LED area lit configuration, it is possible to accomplish picture display to high brightness on a large-sized liquid crystal panel with a low power usage at a reduced cost of the LEDs.

Meanwhile, as a light source used for an LED backlight device, there have so far been provided a large number of the LEDs arrayed in a matrix configuration or in an array configuration. In the array configuration LED backlight device, a large number of LEDs are mounted on the same co-axial line on an interconnection substrate to form a light emitting unit, whilst a plural number of the light emitting units are arrayed on the same co-axial line to form a light emitting array and a plural number of such light emitting arrays are arranged at an equal interval from one another to form a light emitting system. If, in this LED backlight device, a large volume of illuminating light, radiated from many LEDs, is directly incident on the liquid crystal panel through a light guide plate, color irregularities or lamp image are sometimes produced on the liquid crystal panel.

Thus, in the LED backlight device, a light diffusing plate is arranged between a light guide plate and the light emitting unit, the light radiated from each LED is prohibited from directly falling on its area facing each LED, that is, the light is once reflected or controlled in the incidence volume and transmitted through its peripheral area. Also, in the LED backlight device, a so-called side emission LED having directivity such as radiates the outgoing light mainly towards the outer periphery, is used as each LED, in such a manner that the light radiated from each LED will be incident on a peripheral area of the light diffusing plate, by way of light equalization.

With the LED backlight device, a reflecting plate is combined with each light emitting unit so that illuminating light will be efficiently incident on the liquid crystal panel. Moreover, with the LED backlight device, the outgoing light, reflected by the light diffusing plate, or the outgoing light radiated towards the outer rim, is reflected by the reflecting plate to fall on the light diffusing plate. The reflecting plate is formed with many guide through-holes in register with the respective LEDs, and the light emitting parts of the LED units are protruded towards the liquid crystal panel through these guide through-holes.

Meanwhile, in the conventional LED backlight devices, polymer-coated reflective plates are used as substrates formed as expandable PET (polyethylene terephthalate) or aluminum plate. The reflective plate is formed to substantially the same shape as the liquid crystal panel. In addition, in the conventional LED backlight devices, a hermetically sealed spatial section is provided on the back side of the liquid crystal panel for prohibiting leakage of the illuminating light to outside. In this spatial section, there are arranged the aforementioned large number of the LEDs and plates. In this configuration of the LED backlight device, there is accumulated heat generated in the LEDs. If heat is evolved in the LED backlight device, the optical components or the reflective plate, making up the device, are expanded and changed in size, with the result that relative position accuracy between each LED unit and the guide through-holes formed in the reflective plate is subjected to offset.

Moreover, with the above-described LED backlight device, having the above-described structure of the light emitting array, the relative positioning variations in the dimensional accuracy of the interconnection substrate, mounting accuracy of the LEDs, dimensional accuracy of the back panel and in the assembling accuracy of the reflective plate significantly affect the accuracy in relative positions between the LEDs and respective guide throughholes provided in the reflective plate engaged by these LEDs. The LED backlight device is loaded with an increasing number of LEDs, while the reflective plate is increased in size, with increase in the size of the liquid crystal panel. In addition, there are provided a large number of guide through-holes corresponding to the number of the LEDs.

Meanwhile, with the conventional LED backlight device, the machining accuracy of the respective components is made higher, while the components are assembled to high accuracy, to suppress the adverse effects of the positioning offset otherwise caused due to heat generation between the large number of the LEDs and the respective guide throughholes provided in the reflective plate and which are engaged by these LEDs.

However, if the machining accuracy as well as assembling accuracy of the components is made higher, not only is the production cost raised, but also the production efficiency is deteriorated.

The guide through-holes, provided in the reflective plate, are larger in diameter than the LED size in order to take up the position offset between the guide through-holes and the LEDs engaged therein. Should the guide through-holes be enlarged in diameter in this manner, a large gap is produced between the guide through-holes and the LEDs, engaging therewith, so that the illuminating light is leaked through the gap to the back side to lower the light utilization efficiency. Moreover, it becomes necessary to take measures for shielding the light leaked to the back side, thus leading to a complicated structure.

The reflecting plate needs to be of a size matched to the size of the LED backlight device. If the LED backlight device is increased in size, the reflecting plate itself also is to be increased in size. For producing a large-sized reflective plate, it has to be prepared from a material having a sufficient mechanical rigidity. So, the reflective plate formed by an aluminum plate is used. The aluminum plate, forming the reflecting plate, has its surface coated with a polymer, as an insulating material, for assuring electrical insulation. Even if the surface of the aluminum plate is coated with the insulating material, but if guide through-holes engaged by the LEDs are then formed, the aluminum base material is exposed on the inner peripheral surfaces of the guide through-holes, such that there is a risk that electrical insulation cannot be maintained between the reflective plate and the terminal part of the LED, engaged therewith. For resolving this problem, it is contemplated to enlarge the guide through-hole so as to be larger than the outer size of the LED to prevent the terminal of the LED from contacting with the inner surface of the guide through-hole. However, if the guide through-hole is increased in size, the gap between it and the LED part, engaged therewith, is also increased to increase further the leakage of the illuminated light to the back side.

Problem to be Solved by the Invention

It is an object of the present invention to provide a backlight device and a liquid crystal display apparatus whereby the above problem may be overcome and the utilization efficiency of light radiated from a light source is improved to enable light picture display.

It is another object of the present invention to provide a backlight device and a liquid crystal display apparatus whereby leakage of light radiated from the light guide spatial section is suppressed to improve the light utilization efficiency as the machining and assembling of respective component parts are facilitated.

In a backlight device according to the present invention, many light emitting diodes are mounted on the same axis on one surface of an interconnection substrate to form a light emitting unit, and a plurality of such light emitting units are arrayed at equal intervals on the same co-axial lines through an optical sheet block to form a light emitting array on which falls the illuminated light. This backlight device includes plural numbers of reflective sheet pieces and reflective plates which are assembled to a heat radiating plate carrying plural interconnection substrates and forming the light emitting array.

A heat dissipating plate is formed of a metal material having heat conductivity, in which the major surface of a base thereof is formed with a substrate fitting part for carrying the interconnection substrates side-by-side along both sides of the substrate fitting part. There are formed reflective plate supports for extending along both lateral sides of the substrate fitting part. The respective reflecting sheet pieces are formed of a sheet material exhibiting reflection characteristics and are of a length corresponding to the length of a preset number of light emitting diodes and a width smaller than the width of the heat radiating plate. Each of the reflective sheet pieces includes a plurality of guide through-holes through which are passed light emitting parts of the light emitting diodes. The reflecting plate is formed from a plate material exhibiting reflective characteristics to an outer shape approximately equal to the outer shape of the liquid crystal panel. The reflecting plate has a plurality of rows of guide openings through which are passed the light emitting parts of the light emitting diodes.

The reflecting sheet pieces are mounted to the heat radiating plates as the light emitting parts of the light emitting diodes are protruded via facing guide throughholes, with the reflecting plate being superposed on the reflective sheet pieces and bonded in this state to the reflective plate supports of the heat radiating plate, in a manner that the light emitting diodes protruded through the guide through-holes of the reflective sheet pieces are protruded through the guide openings to face the back side of the liquid crystal panel. The reflecting plate, bonded to the heat radiating plate, holds each reflecting sheet pieces to prevent the outgoing light radiated from the light emitting diodes from leaking to the back surface side.

With the backlight device, according to the present invention, in which the reflective sheet pieces are assembled from one light emitting unit to another, the light emanated from the light emitting diodes may be prevented from leaking via the guide through-hole without it being necessary to assure excessive accuracy in machining and assembling the light emitting diodes engaged in these guide through-holes.

A heat pipe fitting part is formed in the base of each heat radiating plate, over the entire longitudinal length of the base. A heat pipe is mounted in the heat pipe fitting part in close contact with its inner wall and heat generated from the light emitting diodes and conducted to the heat dissipating plate is transmitted to heat dissipating means by the heat pipe assembled in the heat pipe fitting part.

A dust-proofing elastic member is bonded to each reflective plate support provided on a lateral side of each heat radiating plate. Each dust-proofing elastic member closes the opened lateral side of the substrate fitting part, carrying the interconnection substrate, for preventing dust and dirt from intruding into the inside of the substrate fitting part.

Each guide opening formed in the reflective plate in association with each light emitting array is formed by a number of groups of guide openings arranged on the same coaxial line, with each group being separated from each neighboring group by a bridge for allowing a plurality of the light emitting diodes to pass therethrough.

The reflecting sheet pieces are assembled to the respective interconnection substrates as the light emitting diodes are passed through the guide through-holes. The reflecting plate is mounted to the reflecting plate supports of each heat radiating plate. Each bridge of the reflecting plate thrusts the reflecting sheet pieces against the heat radiating plate to prevent floating of the reflecting sheet pieces.

Each reflecting sheet piece is formed by an insulating polymer sheet material, and the reflecting plate is formed from an aluminum substrate. To the inner peripheral edge of each guide opening, faced by the aluminum substrate, forming the reflective plate, is mounted an inner peripheral edge of each guide through-hole formed in each reflective sheet piece lesser in diameter than the guide opening over the entire periphery. By the portion of each reflective sheet piece protruding towards the inner peripheral edge of each guide opening of the reflective plate, it is possible to maintain electrical insulation between the aluminum substrate forming the reflective plate and the terminal part of each light emitting diode by each reflective sheet piece.

A liquid crystal display apparatus according to the present invention includes a light transmitting liquid crystal panel, a backlight section having a large number of light emitting diodes for causing a large volume of illuminating light corresponding to the light radiated from the light emitting diodes to the liquid crystal panel, an optical converting section for subjecting the illuminating light to preset optical conversion and for causing the resulting illuminating light to fall on a liquid crystal panel, a light guide unit for causing the illuminating light to fall in an equalized state on the liquid crystal panel, a reflecting part for reflecting the light radiated from each light emitting diode to the surrounding towards the light guide unit, and a heat dissipating section for dissipating the heat generated in the backlight section. The backlight section includes a plurality of light emitting arrays arranged at equal intervals on one surface of an interconnection substrate, each light emitting array being composed of a plurality of light emitting units, each of which is made up of a plurality of light emitting diodes mounted on the same co-axial line. The optical converting section is arranged between the liquid crystal panel and the backlight section, and formed by a laminate of a plurality of functional optical sheets for processing the illuminating light supplied from the backlight section with preset optical conversion to send the so converted illuminating light in a stabilized state to the liquid crystal panel. The optical converting section is formed by a laminate of functional optical sheets, arranged between the liquid crystal panel and the backlight section, and performs the role of polarizing the illuminating light to orthogonal components, the function of correcting the phase difference thereof to widen the angle of field of view and to prevent coloration, and the function of light diffusion, thereby allowing the illuminating light, radiated from the backlight section, to fall in a stabilized state on the liquid crystal panel.

The light conducting section includes a light diffusing light guide plate and a light diffusing plate. The light diffusing light guide plate is formed from e.g. a milk-white light conducting polymer material to a veritable thickness and diffuses the incident illuminating light in the inside thereof to emit the resulting light from the entire surface thereof in an averaged state to the optical converting section. The light diffusing part of the light conducting section selectively performs the reflective diffusing operation and light transmitting operation on the illuminating light to equalize the luminance to cause the light to be incident on the light diffusing light guide plate. The light diffusing plate is formed e.g. of a transparent polymer material and many light dimmer parts exhibiting light reflecting diffusing properties are formed in the portions thereof in register with the respective light emitting diodes. The light diffusing plate controls the volume of light radiated from the directly underlying light emitting diodes and incident thereon to suppress generation of a partially high brightness area to permit the backlight to be incident on the entire surface of the light diffusing light guide plate with even brightness.

The heat radiating section is formed of a metal material exhibiting heat conductivity and includes, on the major surface of a base, a plural number of heat dissipating plates, each having a substrate fitting part, supporting plural interconnection substrates side-by-side along the longitudinal direction on the same co-axial line. The heat radiating plates form support members of the light emitting units and represent heat dissipating plates associated with a plural number of light emitting arrays by being arrayed co-axially at equal intervals one from another on the back surface of the liquid crystal panel. Each heat dissipating plate includes upstanding reflective plate supports for extending along both sides of the substrate fitting part and the reflecting plate is bonded to these reflective plate supports.

Each heat dissipating plate is provided with a plural number of groove-like heat pipe fitting parts, in a bottom surface section of the base formed with substrate fitting sections, with each of heat pipe fitting parts being composed of plural heat pipe fitting parts arranged side-by-side along their entire lengths on the same co-axial line. A heat pipe is assembled in the heat pipe fitting part of each heat radiating plate in tight contact with the inner wall thereof and heat evolved in the light emitting diodes is transmitted by this heat pipe to a heat dissipating means.

The reflecting section reflects the light radiated from each light emitting diode to the surrounding and the light reflected from a light dimmer part of the light diffusing plate towards the light guide section. This reflecting section includes a plurality of reflective sheet pieces and a reflecting plate having an outer shape approximately equal to that of the liquid crystal panel. Each of the reflective sheet pieces is formed from a sheet having reflecting properties to the shape of a rectangle having a length corresponding to a preset number of the light emitting diodes and a width smaller than the width of the heat radiating plate. Each reflective sheet piece is provided with a large number of guide through-holes formed on the same axial line. These guide through-holes are provided for extending along the same co-axial line and are passed through by light emitting parts of the light emitting diodes.

The reflecting sheet pieces are mounted to the heat dissipating plate as the light emitting parts of the light emitting diodes are protruded through the guide through-holes facing the light emitting parts. The reflecting plate is bonded to the reflecting plate supports of the heat radiating plates as the reflective plate is superposed on the reflective sheet pieces to form the reflective section. The light emitting diodes protruded from respective guide through-holes of the reflective sheet pieces face the back surface section of the liquid crystal panel as the respective light emitting parts are protruded from the guide openings.

The heat generated in the plural light emitting diodes is dissipated through a heat dissipating plate having the function of supporting the interconnection substrate. The heat pipe is assembled in the heat pipe fitting part, formed over the entire area along the length of the bottom surface of the base of the heat dissipating plate, in tight contact with the inner wall thereof, for transmitting the heat evolved in each light emitting diode and transmitted to heat radiating means.

The guide opening formed in the reflective plate in association with each light emitting array is formed by a plural number of groups of guide openings arranged on the same coaxial line, with each group of guide openings being separated from a neighboring group by a bridge for allowing a plurality of the light emitting diodes to pass therethrough. As the reflecting plate is bonded to the reflecting plate supports of each heat radiating plate, the bridge thrusts the reflective sheet pieces towards the heat radiating plate to hold the reflective sheet pieces against floating.

The reflective sheet pieces are formed of an insulating polymer sheet material, whilst the reflective plate is formed of aluminum as base material. An opening edge of each guide opening in the reflective sheet piece is protruded inwards over an entire peripheral part from an opening edge of each guide through-hole of the reflective sheet piece, smaller in diameter than each guide opening, in a manner of maintaining electrical insulation between the inner edge of each guide opening and a terminal part of each light emitting diode.

With the backlight device and the liquid crystal display apparatus, employing the backlight device, according to the present invention, picture display may be made to high brightness, even in a large sized liquid crystal panel, as a large volume of illuminating light is supplied from the back panel in an equalized state. Even in case high machining accuracy or high assembling accuracy of the component parts is not maintained, the illuminating light radiated from each light emitting diode may be suppressed from leakage to improve light utilization efficiency to enable display to high brightness.

Other objects and specified advantages of the present invention will become more apparent from the following explanation of preferred embodiments thereof especially when read in conjunction with the drawings.

BEST MODE FOR CARRYING OUT THE INVENTION

Referring to the drawings, an embodiment of the present embodiment, applied to a light transmitting liquid crystal color display apparatus, abbreviated to a liquid crystal display apparatus, will be explained in detail.

Figure 1:
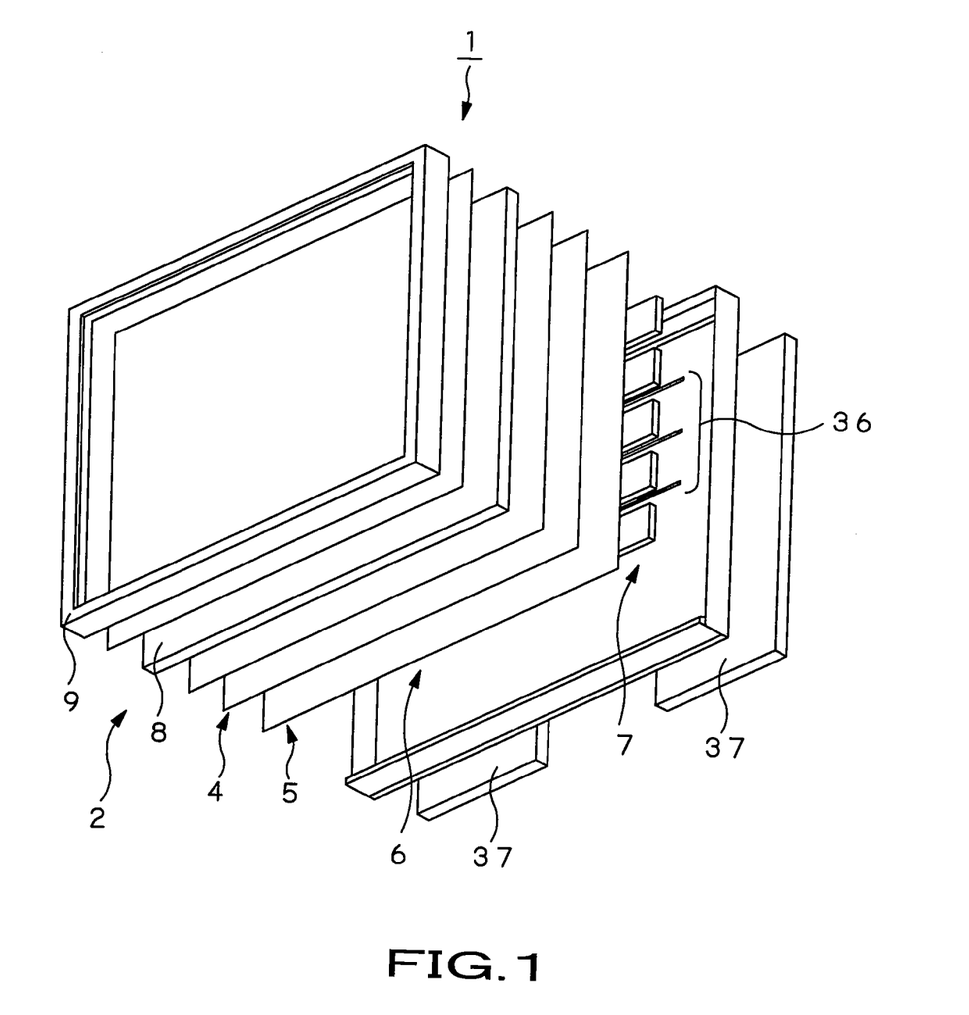
FIG. 1 is an exploded perspective view showing essential parts of a light transmitting liquid crystal display apparatus embodying the present invention.
Figure 2:
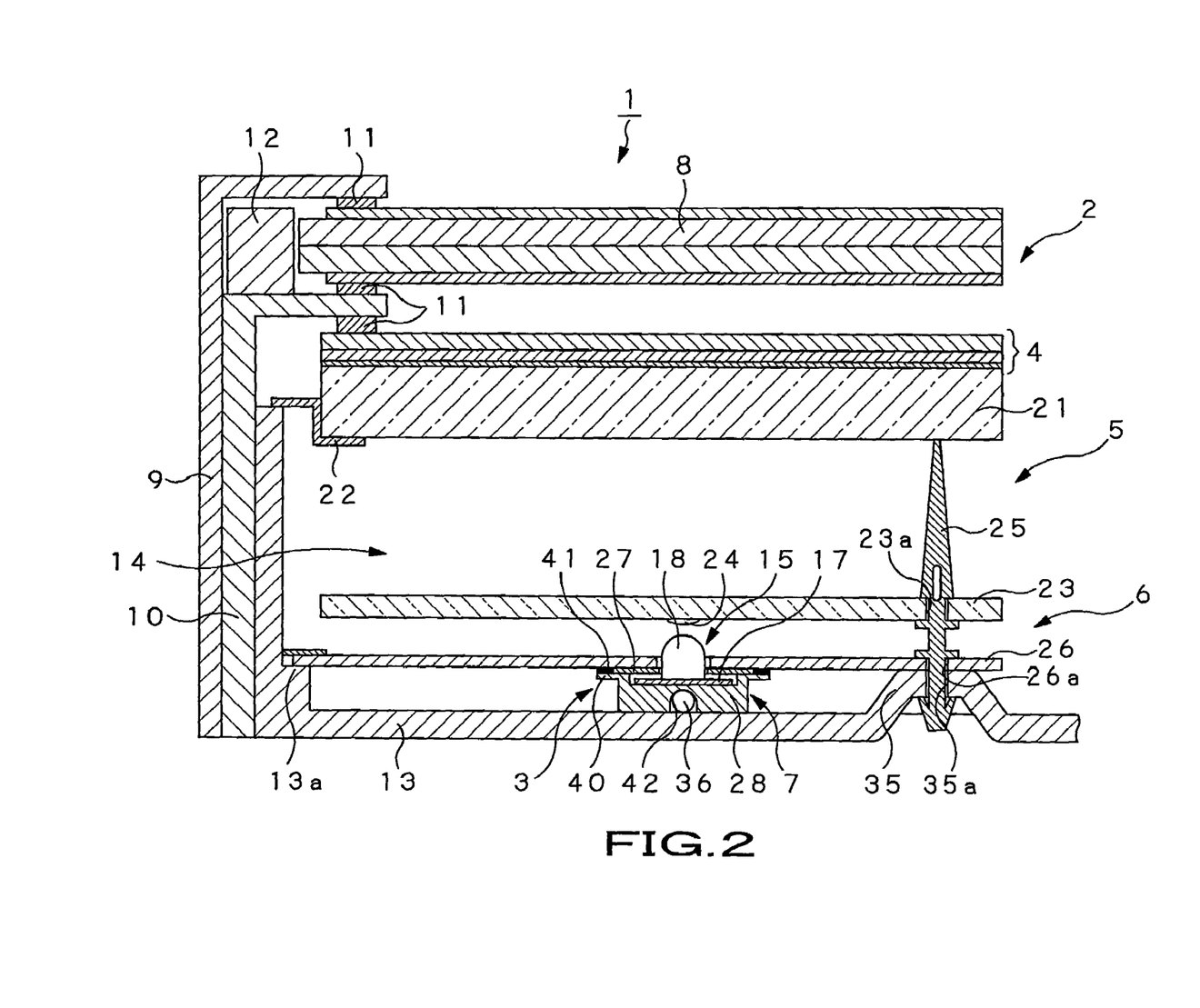
FIG. 2 is a longitudinal cross-sectional view showing essential parts of the light transmitting liquid crystal display apparatus.

A liquid crystal display apparatus 1, according to the present invention, is used in, for example, a television receiver or a display monitor apparatus having a large display surface, for example, a 30 inch display surface or larger. Referring to FIGS. 1 and 2, this liquid crystal display apparatus 1 includes a liquid crystal panel unit 2 and a backlight section 3 mounted on the back side of the liquid crystal panel unit 2 to radiate a large volume of illuminating light. Between the liquid crystal panel unit 2 and the backlight section 3, there are arranged an optical converting section 4 for applying predetermined optical conversion to the illuminating light, radiated from the backlight section 3, and for causing the light to fall on the liquid crystal panel unit 2, a light guide section 5 for causing the illuminating light from the backlight section 3 to fall on the liquid crystal panel unit 2 in an equalized state, a reflecting section 6 for reflecting the illuminating light radiated from the backlight section 3 to a surrounding area to the light guide section 5, and a heat dissipating section 7 for dissipating the heat generated in the backlight section 3.

The liquid crystal pane unit 2 includes a liquid crystal panel 8 of a large display picture image size of a 30-inch size or larger. The liquid crystal panel 8 has its outer rim part sandwiched and carried between a front frame member 9 and a holder frame member 10 via a spacer 11 or a guide member 12, as shown in FIG. 2. The holder frame member 10 and a back panel 13, which will be explained in detail subsequently, form a chassis and are secured to a mounting part of an enclosure, not shown. To the chassis member are mounted respective component members. On the front side of the liquid crystal panel 8 is mounted a cover glass sheet, not shown.

The liquid crystal panel 8 includes a first glass substrate, provided with a transparent electrode, a second glass substrate, similarly provided with a transparent electrode, mounted with a spacing from the first glass substrate, which spacing is maintained by e.g. glass beads, and which also is charged with liquid crystal. The orientation of liquid crystal molecules is changed by an electrical field generated on applying an electrical voltage across the electrodes provided to the glass substrates. On the inner surface of the first glass substrate of the liquid crystal panel 8 are formed striped transparent electrodes, an insulating film and an orientation film. On the inner surface of the second glass substrate of the liquid crystal panel 8 are formed color filters of three prime colors, an overcoat layer, striped transparent electrodes and an orientation film. On the surfaces of first and second glass substrates are bonded a light polarizing film and a phase difference film, respectively. On the liquid crystal panel 8, an orientation film of polyimide is arrayed horizontally with liquid crystal molecules as a boundary surface. The light polarizing film and the phase difference film provide for non-saturation white light wavelength characteristics in order to display a received picture with full-color representation by a color filter.

It is noted that the liquid crystal panel 8, employed in the present invention, is not limited to the one described above, and a variety of liquid crystal panel structures so far presented in the art may be used.

Figure 3:
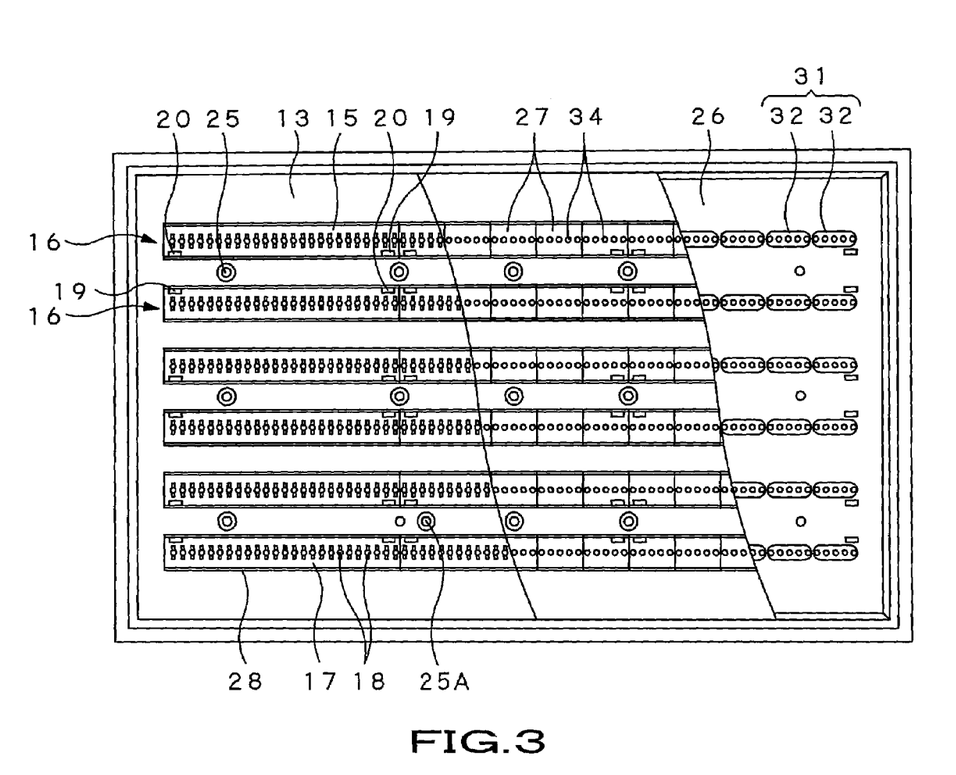
FIG. 3 is a plan view showing a light guide section, a backlight section and a reflecting section, with portions thereof being cut away.

On the back surface side of the liquid crystal panel unit 2 is mounted the backlight section 3, as shown in FIG. 2. The backlight section 3 is arranged facing the entire surface of the liquid crystal panel unit 2 and, in cooperation with the liquid crystal panel unit 2, constitutes an optically hermetically sealed light guide section 14. A preset number of light emitting units 15 are arranged on a single line to from a light emitting array 16. A plural number of the light emitting arrays 16 are arranged parallel one to another at a preset interval one from another to constitute the backlight section 3. In FIG. 3, three of the light emitting units 15 are arranged lengthwise to form a row of the light emitting arrays 16, and six of such rows of the light emitting arrays 16 are arranged side-by-side in the height-wise direction. Thus, 3×6=18 light emitting units 15 make up the backlight section 3.

Each light emitting unit 15, forming the backlight section 3, is made up by e.g. an interconnection substrate 17, plural LEDs 18, mounted on the interconnection substrate 17, an inputting connector 19 and an outputting connector 20, as shown in FIG. 2. In the backlight section 3, a sum total of 25 LED units 18, each composed of a red LED, a green LED and a blue LED, are mounted on the interconnection substrate 17 of each light emitting unit 15, with the 25 LEDs being arrayed in series on the same co-axial line. Consequently, 25×3=75 LEDs 18 are provided for each light emitting array and, in the backlight section 3, a sum total of 75×6=450 LEDs 18 are provided in the six rows.

Figure 5:
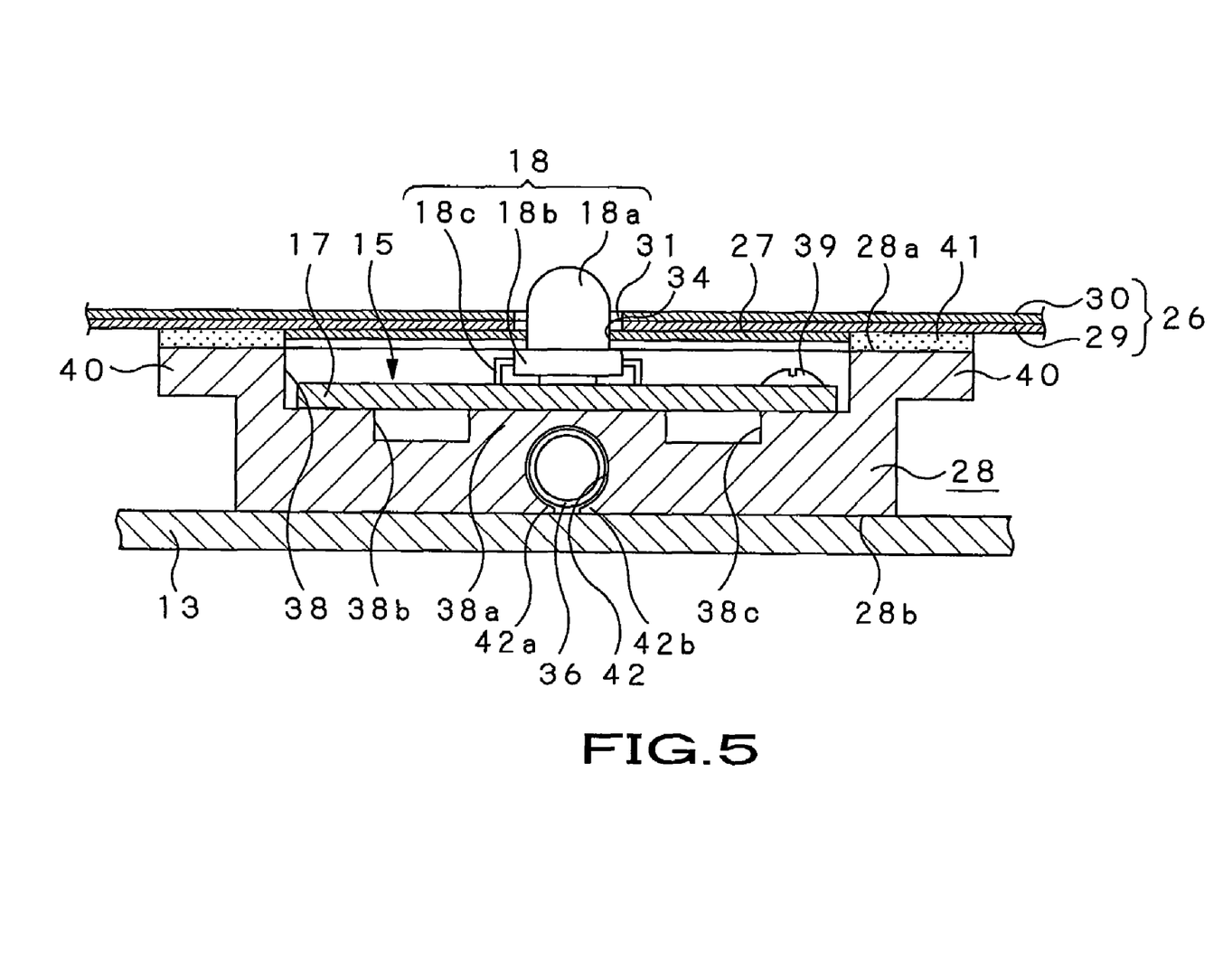
FIG. 5 is a longitudinal cross-sectional view showing essential parts of the light emitting unit of the backlight section, and the reflecting plate and the reflecting sheet piece of the reflecting section.

Referring to FIGS. 2 and 5, each LED unit 18 has a light emitting part 18*a* held by a resin holder 18*b*, from which resin holder are led out a pair of terminals 18*c*. Although not shown in detail, each LED 18 is a so-called side emission LED exhibiting light emission directivity, and radiates the main portion of the radiated light towards the outer periphery of the light emitting part 18*a*. Meanwhile, the number of the light emitting units 15 of the backlight section 3, or the number as well as the intervals of the LED units 18, is determined depending on e.g. the size of the liquid crystal panel 8 or the light emitting capability of each LED unit 18.

In the light emitting units 15, the interconnection substrates 17 are formed to the same design parameters. Although not shown, the interconnection pattern for serial connection of the LEDs or lands interconnecting the terminals of the LED units 18 are formed on each interconnection substrate 17. The inputting connector 19 and the outputting connector 20 are mounted on one end and on the opposite side in the vicinity of the width-wise lateral side of each interconnection substrate 17.

In each light emitting array 16, the light emitting units 15 are arrayed in the same row so that the interconnection substrate 17 will be oriented in the same direction, as shown in FIG. 3. The light emitting units 15 of the odd-numbered light emitting arrays 16, that is, the light emitting arrays of the first, third and the fifth rows, are arrayed so that one side edges of the interconnection substrates 17 carrying the inputting connectors 19 and the outputting connectors 20 are down-turned. On the other hand, the light emitting units 15 of the even-numbered light emitting arrays 16, that is, the light emitting arrays of the second, fourth and the sixth rows, are arrayed so that one side edges of the interconnection substrates 17 carrying the inputting connectors 19 and the outputting connectors 20 are up-turned.

Hence, in the light emitting array 16 a given row, the light emitting units 15 are arrayed so that the inputting connectors 19 and the outputting connectors 20 of the two neighboring interconnection substrates 17 in the same row face one another. Moreover, the light emitting arrays 16 of the even-numbered and odd-numbered rows are arrayed so that the inputting connectors 19 and the outputting connectors 20 of the interconnection substrates 17 of the two facing light emitting units 15 face one another.

The light emitting array 16 in the same row are interconnected in series by lead wires fitted with connectors, not shown. Since the inputting connectors 19 and the outputting connectors 20 face one another, interconnections across the light emitting units 15 may be of shortest length. In each light emitting array 16, the inputting connector 19 is arranged on the rightmost end of a right-hand side light emitting unit 15 of each odd-numbered row, while the outputting connector 20 is arranged on the leftmost end of a left-hand side light emitting unit 15. Similarly, in each light emitting array 16, the outputting connector 20 is arranged on the leftmost end of a left-hand side light emitting unit 15 of each even-numbered row, while the inputting connector 19 is arranged on the rightmost end of a right-hand side light emitting unit 15 of the same row. In each light emitting array 16, lead lines are laid by exploiting a longitudinal spacing formed between an odd-numbered row and an even-numbered row. The lead lines are pulled into and out of each spacing via a pull-out opening, not shown, formed in the back panel 13, and are bundled in each spacing by a clamper, not shown.

In the backlight section 3, the above spacing may be utilized efficiently, while the interconnection process may be simplified, by holding and guiding the lead lines by taking advantage of the spacing formed between the light emitting arrays 16. In the backlight section 3, mistaken mounting of the light emitting units in the same row and between the neighboring rows may be discriminated based on the positions of the inputting connector 19 and the outputting connector 20 mounted on each interconnection substrate 17. Moreover, in the backlight section 3, the interconnection structure or the interconnection process across the interconnection substrates 17 may be simplified, or the lead lines may be used in common, owing to the configuration of each light emitting array 16.

In the liquid crystal display apparatus 1, the large volume of the illuminating light, based on light radiated from each LED unit 18 of the backlight section 3, falls on the liquid crystal panel 8 via optical converting section 4. This optical converting section 4 includes a laminate of a plural number of functional optical sheets having an outer profile approximately similar to the outer profile of the liquid crystal panel 8. Although not shown in detail, the laminate of the optical converting section 4 is made up by a plural number of functional optical sheets, performing a variety of optical functions, such as a functional optical sheet for polarizing the illuminating light, incident from the backlight section 3, into orthogonal polarized light components, a functional optical sheet for compensating for the phase difference of the illuminating light for increasing the angle of field of view and for preventing coloration, or a functional optical sheet diffusing the illuminating light.

Referring to FIG. 2, the optical converting section 4 has the laminate of functional optical sheets combined with the major surface of a light diffusing conducting plate 21 of the light guide section 5, as later explained, and is arranged on the back surface side of the liquid crystal panel 8 by a holing bracket member 22, assembled to the back panel 13, so that a predetermined spacing is maintained between the optical converting section and the liquid crystal panel. The optical converting section 4 is not limited to the above-described laminate of functional optical sheets and may also include, as other functional optical sheets, a brightness improving film, a phase difference film, or a set of upper and lower diffusing sheets with a prism sheet sandwiched in-between.

In the liquid crystal display apparatus 1, the illuminating light, sent from the backlight section 3 via the light guide section 5, is equalized in brightness across the entire surface and guided through the light guide section 14 so as to fall on the liquid crystal panel 8 through the optical converting section 4. The light guide section 5 is made up by a light diffusing conducting plate 21 and a light diffusing plate 23, which are maintained at a preset facing distance from each other by an optical stud member 25 and arranged in the light guide section 14, in a manner which will be explained subsequently.

The light diffusing conducting plate 21 is a plate of the same size as and a thickness slightly thicker than the liquid crystal panel 8, molded from a light conducting milk-white polymer material, such as acrylic polymer or polycarbonate polymer. The light diffusing conducting plate 21 is combined on its one major surface with the functional optical sheet laminate of the optical converting section 4 and has an outer peripheral part retained by a holding bracket member 22. The light diffusing conducting plate 21 diffuses the illuminating light, incident from the opposite side major surface, by internal refraction and irregular reflection, to cause the so diffused illuminating light to be incident from its one major surface to the optical converting section 4, as the light is equalized in brightness over its entire surface.

The light diffusing plate 23 is a plate member formed of a transparent polymer material, such as acrylic resin, to substantially the same size as the liquid crystal panel 8, and is arranged with a preset spacing from the backlight section 3. The light diffusing plate has the function of controlling the state of incidence of light radiated from the LED units 18. A light dimmer pattern 24 is formed a site of the light diffusing plate 23 in register with a light emitting part 18a of each LED unit 18, as shown in FIG. 2.

Each light dimmer pattern 24 is formed by printing a circular pattern slightly larger in diameter than the light emitting part 18a of the LED unit 18, with an ink exhibiting light reflection and diffusion characteristics. Each light dimmer pattern 24 is formed precisely, by e.g. a screen printing method, using an ink obtained on mixing ink ingredients, including a light shielding agent and a diffusing agent, in a preset ratio. The light shielding agent, used in the ink, may be enumerated by titanium oxide, barium oxide, calcium carbonate, alumina oxide, zinc oxide, nickel oxide, calcium hydroxide, lithium sulfide, tri-iron tetroxide, powders of methacrylic resin, mica (sericite), powders of kaolin, kaolin, bentonite, powders of gold or pulp fibers. The diffusing agents, used in the ink, may be enumerated by, for example, silicium oxide, glass beads, fine particles of glass, glass fibers, liquid silicon, quartz powders, gold plated polymer beads, liquid of cholesteric liquid crystal and powders of re-crystallization acrylic resin.

The light diffusing plate 23 reflects the light radiated directly upwards from the light emitting part 18a of the LED unit 18, arranged directly below the light dimmer pattern 24 thereof. The light diffusing plate 23 allows the illuminated light to be incident in a region thereof not carrying the light dimmer pattern 24, that is, in a region thereof not directly facing each light emitting array 16. The light diffusing plate 23 controls the light, radiated from each LED unit 18 and directly incident on the light diffusing plate 23, by each light dimmer pattern 24, to radiate the illuminating light on the entire surface of the light diffusing conducting plate 21, as the light is equalized in brightness by suppressing generation of a locally high brightness area on an illuminated surface.

The light diffusing plate 23 may also be designed so that each light dimmer pattern 24 is formed by a large number of dots formed in an area larger in diameter than the light emitting part 18a of the LED 18 such as to limit the volume of incident light by partially transmitting and by partially reflecting and diffusing the radiated light. The light diffusing plate 23 may be formed in this case as a so-called gradation pattern by having the dots of each light dimmer pattern 24 so as to be higher in a center area than in a peripheral area for limiting the volume of incident light in the center area and for taking up the position misregistration with respect to the LED unit 18. It is noted that, in case the side emission LED unit 18, described above, is used, the illuminated light tends to be concentrated in an area defined between the light emitting arrays 16. In this consideration, each light dimmer pattern 24 may be elongated in an up-and-down direction to suppress this phenomenon.

It is noted that part of the radiated light, radiated from each LED unit 18 and incident on the light diffusing plate 23 at an angle beyond the critical angle, is reflected on the surface of the light diffusing plate 23. The light radiated from each LED unit 18 of the backlight section 3 to a surrounding area, the radiated light reflected from the surface of the light diffusing plate 23 or the radiated light reflected from each light dimmer pattern 24, is reflected by the reflecting section 6 and incident via the light diffusing plate 23 efficiently on the light guide section 5. The reflecting section 6 repeatedly reflects light between it and the light diffusing plate 23 to improve reflectance based on the principle of augmented reflection.

Figure 4:
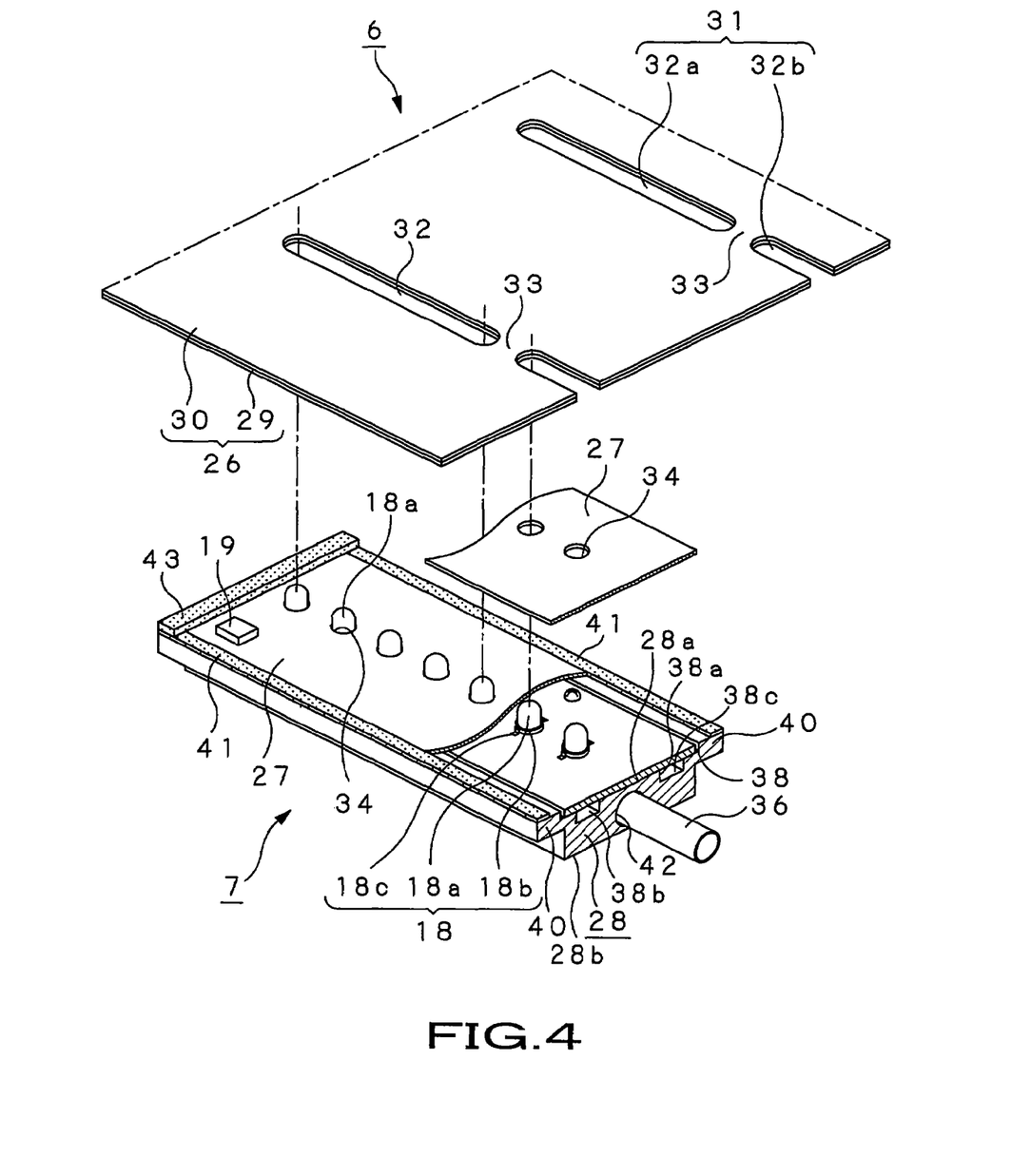
FIG. 4 is an exploded perspective view showing essential parts of a light emitting unit of the backlight section, and a reflecting plate and a reflecting sheet piece of the reflecting section.

Referring to FIGS. 2 and 4, the reflecting section 6 is made up by a large-sized reflecting plate 26 and a large number of reflective sheet pieces 27, provided from one light emitting unit 15 to another. The reflecting plate 26, which will be explained in detail subsequently, is combined with the backlight section 3, as it is positioned by a heat dissipating plate 28 forming the heat dissipating section 7 and by the optical stud member 25. It is by this reflecting plate 26 that the reflective sheet pieces 27 is retained in position.

Since the reflecting plate 26 has a higher surface accuracy, is free from distortion and is formed as a large-sized member of substantially the same size as the liquid crystal panel 8, combined with the light guide section 5 at a preset distance therefrom, the reflecting plate is required to be of a certain mechanical rigidity. Thus, the reflecting plate 26 is formed by a plate 29 of, for example, aluminum, and a layer of expandable PET 30, containing phosphorescent agents, and which is bonded to the surface of the plate 29. The reflecting plate 26 may be formed not only by an aluminum plate, but also by a stainless steel plate presenting a mirror surface. In case the reflecting plate 26 is used for a liquid crystal display apparatus of a smaller size, it may be formed by expandable PET containing e.g. a phosphorescent material. The expandable PET is lightweight, exhibits high reflectance on the order of 95%, and presents a color tint different from metal luster color such that grazing on the reflecting surface is not outstanding. For this reason, the expandable PET is used in conventional liquid crystal devices as well.

Referring to FIG. 3, the reflecting plate 26 is provided with six rows of guide openings 31 in association with the light emitting array 16. In more detail, each row of guide openings 31 includes a number of horizontally elongated rectangular-shaped unit guide openings 32a to 32n, arranged on the same co-axial line and separated from one another by bridges 33. These unit guide openings are sometimes referred to below as a unit guide opening section 32. Each opening of the unit guide opening section 32 has an opening width slightly larger than the outer diameter of the light emitting part 18a of the LED unit 18 and a length long enough to allow five LED units 15 to pass therethrough.

Since each light emitting array 16 has 75 LED units 18, each row of guide openings 31 is made up by 75÷5=15 unit guide opening sections 32. The guide openings 31 are not limited to the above configuration and may be designed as a sole opening having a length corresponding to the entire length of each light emitting array 16. However, since each bridge 33 of the row of guide openings 31 must play the part of assuring mechanical rigidity of the reflecting plate 26 and also of operating as a site for holding the reflective sheet pieces 27, the unit guide opening section 32 is preferably of a length just large enough to permit several LED units 18 to pass therethrough.

Each reflective sheet piece 27 is formed of a material having high reflection characteristics, such as the aforementioned expandable PET, to a rectangular profile of substantially the same length as each interconnection substrate 17 and a width slightly smaller than the width of the heat dissipating plate 2. The reflective sheet piece 27 is provided with 25 guide through-holes 34 in register with the 25 LED units 18 provided on a single straight line on each light emitting unit 15. These guide through-holes 34 are formed side-by-side along the length-wise direction on the same co-axial line in the reflective sheet piece 27 and are each a circular opening the inner diameter of which is substantially equal to that of the light emitting part 18a of the LED unit 18.

The reflective sheet piece 27 is combined with the interconnection substrate 17, carried by the heat dissipating plate 28, as the light emitting parts 18a of the LED units 18 are passed through the registering guide through-holes 34, from one light emitting unit 15 to another. The reflective sheet piece 27 is of a size equal to the size of the light emitting unit 15 and may be directly combined with the interconnection substrate 17 for precisely positioning the LED units 18 from the respective guide through-holes 34. Hence, the reflective sheet piece 27 permits the light emitting part 18a of the LED unit 18 to be protruded from the guide through-hole 34 in a state in which the outer peripheral surface of the light emitting part 18a of the LED unit 18 is tightly contacted with the inner peripheral surface of the guide through-hole 34. Meanwhile, the reflective sheet piece 27 may be formed to the same width as or to a width smaller than the width of a substrate fitting recess 38 of the heat dissipating plate 28, as later explained, so that the opening rim of each guide through-hole 34 will be retained by the upper surface of the resin holder 18b of the LED unit 18.

Referring to FIGS. 3 and 5, the reflecting section 6 is combined with the interconnection substrate 17 as the light emitting part 18a of the LED unit 18 is passed through the registering guide through-hole 34 of the reflective sheet piece 27, from one light emitting unit 15 to another. The reflecting plate 26 is overlaid on each reflective sheet piece 27 and secured in this state to each heat dissipating plate 28, as will be explained subsequently. With the guide opening 31 of the reflecting plate 26 registering with the guide through-hole 34 of the reflective sheet piece 27, the light emitting part 18a of the LED unit 18 is passed through the guide opening 31 of the reflecting plate 26 for facing the light diffusing plate 23.

Each reflective sheet piece 27 is formed by an insulating expandable PET, while the reflecting plate 26 is formed the plate 29 of aluminum and the laminate of expandable PET films 30, as described above. In this case, the inner rim of each guide opening 31 of the reflecting plate 26, where the aluminum substrate is exposed, is combined with the inner rim of each guide through-hole 34 of a smaller diameter, formed in each reflective sheet piece 27 of an insulating material, as shown in FIG. 5. Hence, in the reflecting section 6, electrical insulation is maintained between the portion of the aluminum substrate of the reflecting plate 26 by the reflective sheet piece 27 and the terminal 18c of the LED unit 18.

After assembling the reflective sheet pieces 27, from one light emitting unit 15 to another, the reflecting plate 26 is mounted in position. When secured onto the heat dissipating plate 28, the reflecting plate 26 thrusts and holds the reflective sheet piece 27 against the heat dissipating plate 28. In the reflecting plate 26, the unit guide opening 31 is partitioned into the unit guide opening sections 32, with the intermediary of the bridges 33, to form the row of guide openings 31 via which five LD units 18 are to be protruded. By the bridges 33 thrusting the reflective sheet pieces 27 along the length-wise direction at preset intervals, the reflective sheet pieces 27 may be retained more reliably to dispense with the structure for preventing generation of float or generation of vibrations of the reflective sheet pieces 27 to facilitate the assembling.

Meanwhile, the reflecting section 6 has the large size equal to the liquid crystal panel 8 and is assembled to the backlight section 3 as it is positioned by a support 13a provided to the back panel 13 or the optical stud member 25, as shown in FIG. 2. If, in the reflecting section 6, the row of guide openings 31 is formed in the reflecting plate 26 by circular holes each accommodating an LED unit 18, as in the reflective sheet piece 27, difficulties are met in achieving the registration of the circular hole and the LED unit 18. Since it becomes necessary to form the reflecting plate 26 to high precision and to assemble respective components to high accuracy, the production cost is raised due to the necessity of component manufacture and the high precision assembly step, the reflecting plate 26 becomes distorted due to thermal degradation.

With the reflecting section 6 of the present embodiment, comprised of the reflecting plate 26 and a number of reflective sheet pieces 27, it becomes possible to prevent a gap from being produced in the outer rim of each LED unit 18 and to prevent part of the radiated light from each LED from leaking from the gap on the outer rim towards the back side such as to improve the light efficiency to enable display to high brightness. This reflecting section 6 renders the structure of shielding the light leakage from the back side unnecessary to simplify the structure.

With the reflecting section 6 of the present embodiment, combined from the reflecting plate 26 and a large number of the reflective sheet pieces 27, the light emitting part 18a of each LED unit 18 is inserted into and closely contacted with the guide through-hole 34 formed in each reflective sheet piece 27. Thus, it becomes possible to prevent the light radiated from each LED 18 from leaking through the gap between the inner peripheral wall of the guide through-hole 34 and the outer rim of the light emitting part 18a towards the back side.

With the liquid crystal display apparatus 1 of the present embodiment, the surface brightness of the reflecting plate 26 of the reflecting section 6, constructed as described above, was measured and found to be 6135 cd/m$^2$ in terms of brightness in a center region. The surface brightness of a conventional liquid crystal display apparatus, not having the reflective sheet piece 27, was measured, and found to be 5716 cd/m$^2$ in terms of brightness in a center region. Thus, it was verified that brightness may be improved by approximately 7% with the liquid crystal display apparatus 1 of the present embodiment.

Although the reflective sheet piece 27, forming the reflecting section 6, is formed to a size that may be assembled from one light emitting unit 15 to another two or more reflective sheet pieces 27 may be combined, depending on the size of the light emitting unit 15, or the reflective sheet piece 27 may be sized to be astride a plural number of the light emitting units 15. However, if the reflective sheet piece 27, forming the reflecting section 6, is of an exceedingly large size, accurate position matching between each guide through-hole 34 and the LED unit 18 becomes difficult to achieve, such that the above-described favorable effect proper to the laminate structure cannot be displayed. Consequently, the reflective sheet piece 27 is formed to a preset suitable size.

The liquid crystal display apparatus 1 of the present embodiment is constructed such that many optical stud members 25 are mounted to the back panel 13, the functional optical sheets forming the aforementioned optical converting section 4, the light diffusing conducting plate 21 and the holding bracket member 22, forming the light guide section 5, and the reflecting plate 26, forming the reflecting section 6, are positioned relative to one another and such that parallelism between facing major surfaces in their entirety will be maintained to high accuracy.

The light diffusing plate 23 and the reflecting plate 26 are provided with a large number of fitting holes 23a, 26a, respectively, for combination with the optical stud members 25. These fitting holes 23a, 26a are positioned between neighboring rows of the light emitting arrays 16 and are formed in axial alignment to one another.

Figure 6:
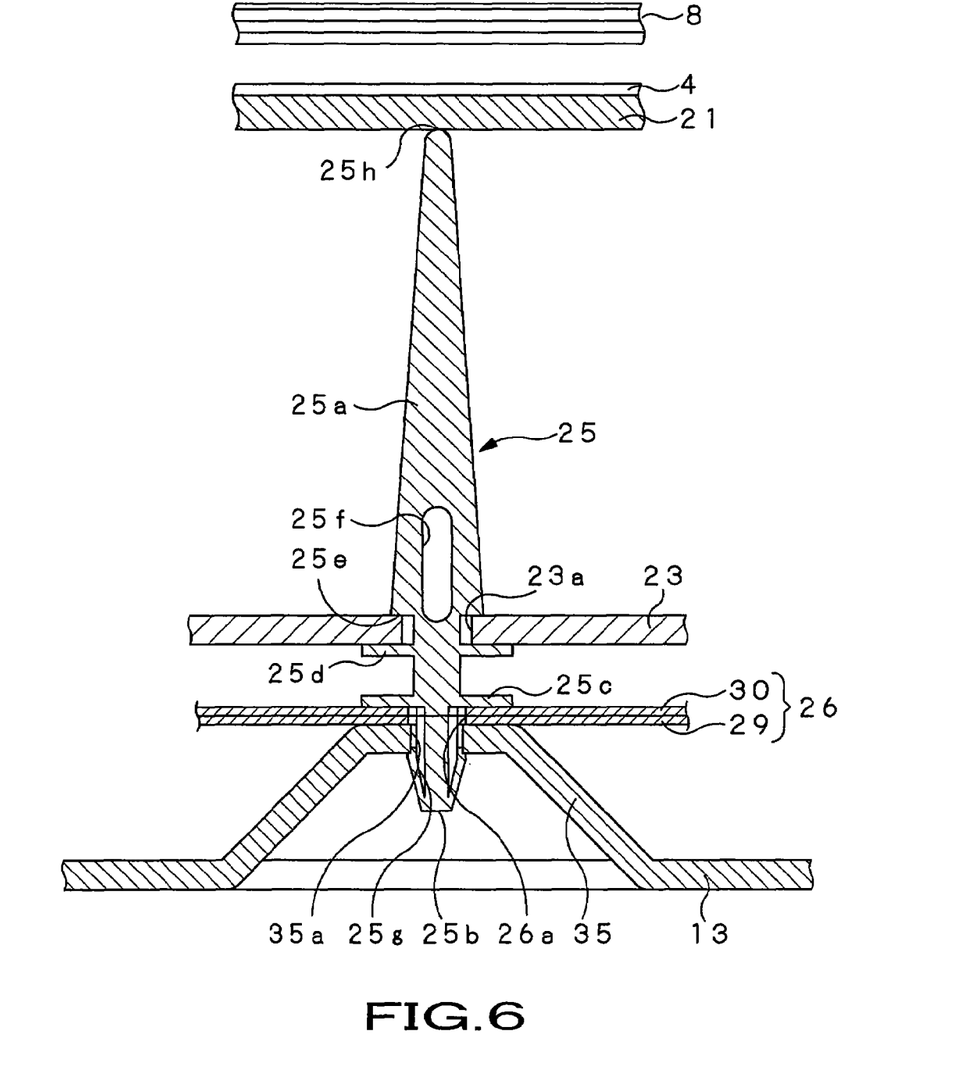
FIG. 6 is a longitudinal cross-sectional view showing essential parts of the light guide section and an optical stud member.

Each optical stud member 25 is a unitary member formed of a polymer material of a milk-white color exhibiting light conductivity, mechanical strength and a certain degree of elasticity, such as polycarbonate, and is mounted to a mounting member 35 formed as one with the back panel 13, as shown in FIGS. 2 and 6. There are formed many substantially trapezoidally shaped mounting members 35 formed as one with the inner surface of the back panel 13. The upper surface of each mounting member 35 forms a surface on which to set the light diffusing plate 23. A through-hole 35c is formed in each mounting member 35. Meanwhile, the mounting members 35 are positioned between the rows of the light emitting arrays 16 in a state in which the backlight section 3 has been assembled to the back panel 13.

Referring to FIG. 6, each optical stud member 25 is made up by a shaft-shaped base part 25a, a fitting part 25b, formed to the distal end of the shaft-shaped base part 25a, a flange-shaped first receiving plate part 25c, formed as one with the lateral surface of the shaft-shaped base part 25a, with a preset spacing from the fitting part 25b, and a flange-shaped second receiving plate part 25d, formed as one with the lateral surface of the shaft-shaped base part 25a, with a preset spacing from the first receiving plate part 25c. The shaft-shaped base part 25a of each optical stud member 25 is formed to an axial length such that the shaft-shaped base part 25a is of a length prescribing the facing interval between the mounting member 35 of the back panel 13 and the light diffusing conducting plate 21. A step 25e is formed at a preset height position from the second receiving plate part 25d.

The shaft-shaped base part 25a of each optical stud member 25 is formed as an elongated tapered conical member slightly larger in diameter at the step 25e than the fitting hole 23a formed in the light diffusing plate 23 and tapering towards its distal end. At a position slightly above the step 25e of each stud member 25 is formed a through-hole 25f for forming an elastically deformable portion in an area of the base part 25a. This through-hole 25f is provided in a portion of the shaft-shaped base part 25a the outer diameter of which is larger than the diameter of the fitting hole 23a of the light diffusing plate 23.

With each optical stud member 25, the first receiving plate part 25c and the second receiving plate part 25d are formed to a separation maintaining the facing interval between the light diffusing plate 23 and the reflecting plate 26. The site of the first receiving plate part 25c and the second receiving plate part 25d of the shaft-shaped base part 25a of the optical stud member 25 is of a diameter approximately equal to the diameter of the fitting hole 23a in the light diffusing plate 23. The distal end of the fitting part 25b of each optical stud member 25 is of an outer diameter approximately equal to the diameter of a mounting through-hole 35a formed in the back panel side portion of the mounting member 35. Each optical stud member 25 is progressively increased in diameter so as to be larger in diameter than the inner diameter of the mounting through-hole 35a along its axis. To each optical stud member 25 is applied the tendency towards contraction by forming a slit 25g extending from the large diameter site towards the distal end.

Each optical stud member 25 is designed so that the spacing between the large diameter portion of the fitting part 25a and the first receiving plate part 25c is approximately equal to the sum of the thickness of the back panel 13 and that of the light diffusing plate 23. Each optical stud member 25 is also designed so that the diameter of the first receiving plate part 25c is slightly larger than the inner diameter of the fitting hole 23a of the light diffusing plate 23 and so that the diameter of the second receiving plate part 25d is slightly larger than the inner diameter of the fitting hole 26a of the reflecting plate 26.

The reflecting plate 26 is assembled on the mounting member 35 of the back panel 13, as the heat dissipating section 7 and the backlight section 3 have been assembled on the back panel 13, and as the mounting through-hole 35a formed in the mounting member 35 faces the fitting part 25b. In this state, the fitting part 25b of each optical stud member 25 is pushed into the mounting through-hole 35a formed in the mounting member 35 through the fitting hole 26a of the reflecting plate 26. Each optical stud member 25 is subjected to contraction by the action of the slit 25g when the fitting part 25b is passed through the mounting through-hole 35a and, after the fitting part 25b has traversed the mounting through-hole 35a, each optical stud member 25 is restored to its original natural state, whereby the optical stud member is assembled in the erected state in an extrication-proofed manner.

At this time, the mounting member 35 and the reflecting plate 26 are clamped along the direction of thickness between the fitting part 25b and the first receiving plate part 25c of each optical stud member 25, as shown in FIG. 6. The result is that the reflecting plate 26 is retained as it is positioned with respect to the back panel 13 for highly accurately positioning and retaining each reflective sheet piece 27. In this state, each optical stud member 25 is protruded above the mounting member 35 of the back panel 13 as the portion of the shaft-shaped base part 25a above the first receiving plate part 25c is protruded from the reflecting plate 26.

The light diffusing plate 23 is then assembled to each optical stud member 25 by fitting the light diffusing plate at the fitting holes 23a from the distal end 25h. The large diameter portion of each optical stud member 25 is contracted under the action of the slit 17f to enable the axially thrust light diffusing plate 23 to ride over the step 25e. When the light diffusing plate 23 rides over the step 25e to compress against the second receiving plate part 25d, the large diameter portion of each optical stud member 25 is restored to its natural state to clamp the light diffusing plate 23 between the step 25e and the second receiving plate part 25d along the direction of thickness thereof.

The portion of each optical stud member 25 lying above the second receiving plate part 25d of the shaft-shaped base part 25a is protruded from the light diffusing plate 23, as shown in FIGS. 2 and 6. The light diffusing conducting plate 21, comprising a laminate of functional optical sheets of the optical converting section 4, is assembled to the distal end 25h of each optical stud member 25, with the distal end compressing against the bottom surface of the light diffusing conducting plate.

On the other hand, the portion of each optical stud member 25 above the second receiving plate part 25d of the shaft-shaped base part 25a is protruded from the light diffusing plate 23. The light diffusing conducting plate 21, comprised of a laminate of functional optical sheets, is assembled to the distal end 25h of each optical stud member 25, with the bottom side of the light diffusing conducting plate 21 abutting against the distal end 25.

Each optical stud member 25 is assembled on the mounting member 35 of the back panel 13 by a simple method of thrusting the fitting part 25b into the mounting through-hole 35a. Each optical stud member 25 positions the light diffusing plate 23 and the reflecting plate 26, while maintaining the facing interval between the light diffusing plate 23 and the reflecting plate 26 and that between the light diffusing conducting plate 21 and the optical converting section 4 to high precision. By employing larger numbers of the optical stud members 25, complex positioning structures or space keeping structures are dispensed with, while the assembling process may be simplified.

Meanwhile, the optical stud members 25 may be interchangeably used for various sizes of the liquid crystal panel 8, thus providing for common use of components. The optical stud member 25 is not limited to the above-described structure and specific structures of each portion thereof may suitably be changed based on the structure of the liquid crystal display apparatus 1. In the above-described configuration, the optical stud member 25 is mounted in position by being pushed into the mounting through-hole 35a of the back panel 13 by forming the slit 25g in the fitting part 25b, for example, to enable the mounting of the optical stud member 25. Alternatively, an extraction-proofing protrusion may be formed as one on the outer rim of the optical stud member 25 and fitted into the mounting through-hole 35a formed with a key groove on the inner rim, with the optical stud member 25 then being partially rotated for extrication-proofing.

The above plates are precisely positioned relative to the optical stud member 25 to realize conduction, diffusion or reflection of the illuminating light in a stable state within the light guide section 14 defined between the liquid crystal panel 8 and the backlight section 3 to prevent e.g. color irregularities on the liquid crystal panel 8. It is noted that the optical stud member 25 is formed by the milk-white light-conducting polymer material, as described above, and hence diffuses the illuminating light introduced into its inside from the outer peripheral surface to prevent the distal end 25h from being partially illuminated to enable the illuminating light to be incident evenly from the light guide section 14 into the light diffusing conducting plate 21.

Referring to FIG. 3, five of the optical stud members 25 between neighboring light emitting arrays 16 and three of the optical stud members 25 are mounted on the back panel 13, as shown in FIG. 3. It should be noted that, since the front surface properties and the back surface properties of the light diffusing plate 23, carrying the light dimmer pattern 24, aluminum plate 29, and the reflecting plate 26 carrying layers of expandable PET 30, differ from each other, it is necessary to pay attention so that the front sides of these plates shall not be mistaken from the back sides thereof in assembling.

In the light diffusing plate 23 and the reflecting plate 26, five and three of the fitting holes 23a, 26a traversed by the shaft-shaped base parts 25a of the optical stud members 25, as described above, and extending in the transverse direction and in the vertical direction, respectively, totaling at 15, are formed in register with the mounting positions of the respective optical stud members 25. A second optical stud member 25A from the leftmost end of the lowermost row is mounted upright on the back panel 13 in a non-aligned relationship to the optical stud members 25 of the respective upper rows. In the light diffusing plate 23 and the reflecting plate 26, the fitting holes 23a, 26a from the leftmost end of the lowermost row, facing the second optical stud member 25A, are formed offset from the fitting holes 23a, 26a of the respective upper rows.

Consequently, even if the front surfaces of the light diffusing plate 23 and the reflecting plate 26 are mistaken for the back surfaces thereof in assembling, there are provided no fitting holes 23a, 26a in the positions facing the optical stud member 25A, assembling cannot be made using the optical stud members 25. With use of this configuration, it is possible to prevent mistaken combinations of the light diffusing plate 23 and the reflecting plate 26.

The optical stud member 25A and the fitting holes 23a, 26a, formed in the light diffusing plate 23 and the reflecting plate 26, respectively, making up the mistaken combination prohibiting structure, may be provided in any desired position other than the center position. However, these may preferably be formed in the inner peripheral area, rather than in an outer peripheral area, for assembling respective components under a stable condition. Moreover, these are desirably provided in plural locations, rather than in one location.

In the backlight section 3, there are provided a larger number of LEDs 18 for enabling a large capacity of illuminating light to fall on the liquid crystal panel unit 2 to provide for display to higher brightness. The heat generated at this time in each LED unit 18 is stored in the hermetically sealed light guide section 14 defined between the liquid crystal panel unit 2 and the backlight section 3 without being dissipated to outside. The result is that the inside of the device 1 is heated to higher temperatures to degrade the properties of the functional optical sheets of the optical converting section 4 or to render the lighted state of the LEDs 18 unstable to produce color irregularities in the liquid crystal panel 8. In addition, the operation of the electronic components, making up the circuit unit, is destabilized, or marked dimensional changes may be produced in the respective component parts.

For this reason, the heat generated from the respective LEDs is dissipated by the heat dissipating section 7. This heat dissipating section 7 is made up by heat dissipating plates 28, also used as mounting members for the light emitting units 15, heat pipes 36 combined with these heat dissipating plates 28, heat sinks 37 arranged on the back side of the back panel 13 and which are connected to the ends of the heat pipes 36 for receiving heat conducted therefrom, and by a cooling fan, not shown, for promoting the cooling functions of the heat sinks 37.

Each heat dissipating plate 28 is provided for each of the six rows of the light emitting arrays 16, and is formed of aluminum, which is lightweight, inexpensive and superior in workability and in thermal conductivity. By extrusion working, the heat dissipating plate in the form of an elongated plate substantially equal in length and width to the aforementioned light emitting array 16 is prepared. Each heat dissipating plate 28 is simultaneously used as a mounting member, three light emitting units 15 are mounted to, and hence the heat dissipating plate 28 is to be of a predetermined thickness to assure a mechanical rigidity. Meanwhile, each heat dissipating plate 28 is not necessarily formed of an aluminum material and may also be formed of a material having a superior thermal conductivity, such as aluminum alloy, magnesium alloy, silver alloy or copper. In case the liquid crystal display apparatus 1 is of a smaller size, each heat dissipating plate 28 may also be formed by any suitable working method, such as press working or slicing.

Referring to FIG. 5, three interconnection substrates 17, each forming the light emitting unit 15, are mounted to each heat dissipating plate 28, with its first major surface 28a as a mounting surface, with the respective longitudinal end faces of the interconnection substrates 17 abutting against one another. A substrate fitting recess 38, in which is fitted the interconnection substrate 17, is formed in the first major surface 28a of each heat dissipating plate 28 for extending along its entire length. The substrate fitting recess 38 of each heat dissipating plate 28 is substantially of the same width as and a height slightly larger than the thickness of the interconnection substrate 17, and holds the bottom surface and both side edges along the width-wise direction of the interconnection substrate 17 fitted therein. Each heat dissipating plate 28 secures the interconnection substrate 17, fitted in the substrate fitting recess 38, by a plural number of set screws 39.

Within the substrate fitting recess 38 of each heat dissipating plate 28, a width-wise center area is left as a projection of a preset width to form a longitudinal support projection 38a on which is tightly contacted the bottom surface of the interconnection substrate 17. On both sides of the support projection 38a are formed recesses 38b, 38c for extending along the entire longitudinal extent. The support projection 38a of each heat dissipating plate 28 is formed to a width corresponding to the width of an LED mounting area which mounts each LED 18 of the interconnection substrate 17, as shown in FIG. 5, so that heat may be efficiently transmitted and dissipated from the LED mounting area which becomes hottest as a result of illumination of each LED unit 18. Although each heat dissipating plate 28 is formed with the recesses 38b, 38c for reducing the weight and for maintaining dimensional accuracy, these recesses 38b, 38c may also be designed as heat pipe fitting parts.

Each heat dissipating plate 28 is formed as one with reflecting plate supports 40, 40 for the entire longitudinal extent along both sides of the opening edges of the substrate fitting recess 38. The reflecting plate supports 40, 40 are plate-shaped sites projected along the width-wise direction from the opening edges of the substrate fitting recess 38 of the heat dissipating plate 28 and are of an overall width larger than the width of the reflective sheet piece 27 and, as shown in FIG. 5, the first major surface 28a of the heat radiating plate 28 on the whole is larger in width than the reflective sheet piece 27. The reflecting plate supports 40, 40 retain both lateral edges of the reflective sheet piece 27 associated with the light emitting unit 15 as the light emitting part 18a of each LED unit 18 is protruded from the guide through-hole 34 facing the LED unit.

Meanwhile, the reflecting plate supports 40, 40 support both lateral sides of the reflective sheet piece 27 in case the reflective sheet piece 27 is formed to a width larger than the opening width of the substrate fitting recess 38. The reflecting plate supports 40, 40 are designed for holding the reflective sheet piece 27, associated with the light emitting unit, in a height-wise position of protruding the light emitting part 18a of each LED unit 18 from the guide through-hole 34 facing the LED unit.

In the heat dissipating section 7, six heat dissipating plates 28 are mounted on the inner surface of the back panel 13 at a preset spacing from one another. To each heat dissipating plate 28 are mounted three light emitting units 15 to form mounting members for the six rows of the light emitting arrays 16. Three light emitting units 15, each mounting a preset number of the LED units, are mounted within the substrate fitting recess 38. In the heat dissipating section 7, the reflecting plate 26, forming the reflecting section 6, is mounted for overlying each heat dissipating plates 28, as the reflective sheet piece 27 is assembled to each light emitting unit 15.

The inner surface of the reflecting plate 26 is thrust against the reflecting plate supports 40, 40 of each heat dissipating plate 28. On the reflecting plate supports 40, 40 of each heat dissipating plate 28, double-sided adhesive tapes 41, 41 are bonded over the entire length to bond and secure the inner surface of the reflecting plate 26 thrust thereto. The reflecting plate 26 has its outer rim carried by the support 13a formed on the back panel 13, and is carried in an area defined between the light emitting arrays 16 by the optical stud member 25, while being carried by the reflecting plate supports 40, 40 in an area of the heat dissipating plate 28 forming each light emitting array 16. The reflecting plate 26, constructed as described above, may be positioned accurately, and may be mounted in positioning a state free from distortion.

The heat dissipating plate 28, forming the heat dissipating section 7, operates as a mounting member for the light emitting unit 15 of the backlight section 3, while also operating as a mounting member of the reflecting plate 26 forming the reflecting section 6. With each heat dissipating plate 28 operating as a mounting member for the reflecting plate 26, the reflecting plate 26 may be positioned and held to a high accuracy to improve light efficiency as well as to prevent color irregularities from being produced. Moreover, the reflecting plate 26 may be combined extremely readily to each heat dissipating plate 28.

In the above embodiment, the reflecting plate 26 is bonded in position by double-sided adhesive tapes 41, 41 bonded in turn to the reflecting plate supports 40, 40 of each heat dissipating plates 28. Alternatively, the reflective plate may be secured in position by an adhesive coated on the reflecting plate supports 40, 40.

As described above, the substrate fitting recess 38 is formed in the entire area along the length of the major surface of the heat dissipating plates 28, the interconnection substrate 17 of each light emitting unit 15 is assembled in the substrate fitting recess 38, and the reflecting plate 26 is bonded to the reflecting plate supports 40, 40 to close the substrate fitting recess 38, each heat dissipating plates 28 substantially hermetically sealing the substrate fitting recess 38 on the major surface side, thus assuring dust-proofness.

As described above, the substrate fitting recess 38 is formed along the entire length of the heat dissipating plates 28 and both end faces of the heat dissipating plates 28 are kept open. A dust-proofing member 43, formed e.g. of expandable urethane polymer or a sponge material, is bonded to the reflecting plate supports 40, 40 provided on both sides of the heat dissipating plate 28, as shown in FIG.

4. With the opened portions on both ends of the substrate fitting recess 38 thus being closed by the dust-proofing member 43, it is possible to prevent invasion of dust and dirt into the substrate fitting recess 38 to improve dust-proofness.

Referring to FIG. 5, the second major surface 28b, opposite to the first major surface 28a, of each heat dissipating plate 28, is formed as one with a heat pipe fitting recess 42, in which is fitted the heat pipe 36, and with a plural number of mounting studs and positioning dowels, not shown, forming a mounting portion with respect to the back panel 13. The heat pipe fitting recess 42 is a groove of a substantially arched cross-section opened in a mid portion along the width-wise direction in the second major surface 28b facing a receiving projection 38a of the first major surface 28a, with the groove extending along the entire lengthwise extent of the second major surface 28b. The heat pipe fitting recess 42 has a width of an opening approximately equal to the outer diameter of the heat pipe 36. The site of the opening is formed as one with caulked flanges 42a, 42b.

Each heat dissipating plates 28 includes a heat pipe 36, assembled into the heat pipe fitting recess 42. Each heat pipe 36 is assembled from the opening of the heat pipe fitting recess 42 into the inside thereof and, as shown in FIG. 5, is assembled with its outer peripheral part tightly contacted with the inner wall of the heat pipe fitting recess 42, by caulking the flanges 42a, 42b for closing the opening. Each heat pipe 36 is mounted to each heat dissipating plate 28 over its entire length, at a site facing the mounting area of the LED unit 18, for assuring efficient heat dissipation.

In the present heat dissipating section 7, each heat dissipating plate 28 is used simultaneously as a holding member for the heat pipe 36, by having the heat pipe 36 assembled in position in the heat pipe fitting recess 42 provided to each heat dissipating plate 28. This simplifies the mounting structure of the heat pipe 36, while facilitating the handling of the heat pipe 36, as a precision component, during assembling, and preventing warping or destruction. Since each heat dissipating plate 28 assembles the light emitting unit 15 and the heat pipe 36 in a state in which these are positioned in close proximity to each other, an efficient heat conducting path is formed between the light emitting unit 15 and the heat pipe 36. Each heat dissipating plate 28 is secured in position to the back panel 13 via a mounting stud or a positioning dowel, as the light emitting units 15 are mounted within the substrate fitting recess 38 and as the heat pipe 36 is assembled within the heat pipe fitting recess 42. Meanwhile, each heat dissipating plate 28 may be secured to the inner surface of the back panel 13 by exploiting the set screws 39 used for securing the interconnection substrate 17.

With the above-described heat dissipating section 7, the heat pipe 36 is mounted in the heat pipe fitting recess 38 formed for opening in the second major surface 28b of each heat dissipating plate 28. It is however also possible to form a heat pipe fitting hole in at least one longitudinal end of each heat dissipating plate 28 and to assemble the heat pipe 36 into the inside from the lateral surface side.

The heat pipe 36 is a member routinely used for effecting heat conduction from e.g. a power supply unit, heated to high temperatures, to heat dissipating means, in various electronic devices, and is comprised of an evacuated metal pipe having high electrical conductivity, such as copper pipe, in which there is enclosed a conducting medium, such as water, vaporized at a preset temperature. The heat pipe has a heat conducting capability to a high efficiency. The heat pipe 36 is assembled as one with each heat dissipating plate 28 and has its both ends connected to the heat sink 37 along with the heat dissipating plate 28. In the heat pipe 36, the conducting medium, enclosed in the inside, is subjected to heat conduction from the high temperature side heat radiating plate 28, and is thereby vaporized from the liquid state. In the heat pipe 36, the vaporized conducting medium flows through the pipe to a junction to the low temperature side heat sink 37 so as to be liquidized on being cooled to release the heat of condensation. In the heat pipe 36, the liquidized conducting medium is migrated towards the heat dissipating plate by the capillary phenomenon through larger numbers of ribs formed on the inner wall of a metal pipe or through a layer of a porous material towards the heat radiating plate 28 so as to be circulated in the pipe to carry out a high efficiency heat conducting operation.

The heat sink 37 is mounted on both longitudinal sides on the back surface of the back panel 13. Since the heat sink 37 is used as a heat dissipating member for a power supply unit in a variety of electronic devices, either singly or in combination with the heat pipe 36, larger numbers of fins are formed as one with the heat sink, from an aluminum material having superior heat conductivity. The heat sink 37 has a large surface area and dissipates heat conducted from a high temperature side from the surface of each fin to cool high temperature portions.

The larger the size of the heat sink 37, the larger is the heat dissipating action. This, however, increases the overall thickness of the device. The heat sink 37 is a component of a large size and weight and is in need of a circuit component in case of direct mounting to the interconnection substrate, a mounting bracket member for assuring insulation from e.g. a circuit component or an interconnection pattern or a heat conducting member interposed between the heat sink and high temperature sites.

By dexterously arranging the large-sized heat sink 37 on the back panel 13, using larger numbers of heat dissipating plates 28 and heat pipes 36, it becomes possible to dissipate heat generated from the backlight section 3 efficiently as the overall device is suppressed from increasing in size. In the liquid crystal display apparatus 1, it is unnecessary to take measures such as forming a clearance recess along the route of laying the heat pipe 36, such that the back panel 13 in its entirety can be formed to a flat shape. The heat sink 37 is assembled on both sides of the back surface for laying the heat pipe 36 so that a flat site will be formed in a center area of the back panel 13.

The back panel 13 is formed as a member of a size slightly larger than the outer size of the liquid crystal panel 8 from an aluminum material relatively small in weight and exhibiting mechanical rigidity. The back panel 13 has thermal conductivity by itself such that it is able to dissipate heat evolved from the light guide section 14 or circuit components. The back panel 13 includes outer peripheral wall sections on its outer periphery for mounting a front face frame member 9 or a holder frame member 10, as described above, while including a mounting part for mounting the optical stud member 25 or the heat dissipating plate 28, a readout opening for leading out a lead line and an engaging portion.

The liquid crystal display apparatus 1 is provided with a liquid crystal controller for outputting operation controlling signals for the liquid crystal panel 8, a power supply control unit for controlling the liquid crystal panel 8 or the power supply unit, and with a control circuit package, such as an LED control unit for controlling the backlight section 3. The back panel 13 is used simultaneously as a loading panel for these control circuit packages and suitably loaded on the back side in a manner not shown. On both lateral sides of the back panel 13 are mounted heat sinks 37 and a variety of control circuit packages are mounted on a control board mounted on the flat center area.

In the foregoing, explanation has been made of the light transmitting liquid crystal display apparatus used for a television receiver having a large display surface with a size not less than 30 inches. However, the present invention may be used with advantage for a variety of liquid crystal display apparatus having a large display area. Although the present invention is highly useful when used with a large display apparatus, similar favorable results may be obtained when the present invention is used for medium-sized display apparatus.

The present invention is not limited to the above embodiments described with reference to the drawings and, as may be apparent to those skilled in the art, various changes substitutions by equivalents may be attempted without departing from the scope of the invention as set forth in the appended claims.

What is claimed is:

1. A backlight device in which a plurality of light emitting units, each mounting many light emitting diodes on the same co-axial line on one surface of an interconnection substrate, are mounted on the same co-axial line to form a light emitting array, a plurality of said light emitting arrays are arranged at equal intervals on the back surface of a light transmitting liquid crystal panel, and in which the light radiated from said light emitting diodes are supplied through an optical sheet block to said liquid crystal panel to illuminate said liquid crystal panel, said backlight device comprising a heat radiating plate formed of a metal material exhibiting heat conductivity and having a substrate fitting part for arraying a plurality of said interconnection substrates side-by-side on the same coaxial line on a major surface of the heat radiating plate base having upstanding reflecting plate supports formed as one therewith and extending along the lateral sides of said substrate fitting part;

a plurality of reflective sheet pieces each being formed of a sheet material exhibiting reflecting characteristics as a rectangular piece of a length corresponding to the length of said preset number of said light emitting diodes and a width smaller than the width of said heat radiating plate, each of said reflective sheet pieces including a plurality of guide through-holes through which are passed light emitting parts of said light emitting diodes; and a reflecting plate formed from a plate material exhibiting reflective characteristics to an outer shape approximately equal to the outer shape of said liquid crystal panel, said reflecting plate having a plurality of rows of guide openings in register with said light emitting arrays and through which are passed the light emitting parts of said light emitting diodes;

said reflecting sheet pieces being mounted to said heat radiating plates as the light emitting parts of said light emitting diodes are protruded via those of said guide through-holes facing said light emitting parts, said reflecting plate being superposed on said reflective sheet pieces and bonded in this state to said reflective plate supports of said heat radiating plates, in a manner that the light emitting diodes protruded through said guide through-holes of said reflective sheet pieces are protruded through said guide openings to face the back side of said liquid crystal panel.

2. The backlight device according to claim 1 wherein a heat pipe fitting part is formed on the bottom surface of said base formed with said substrate fitting part, over the entire longitudinal length of the bottom surface of said base formed with said substrate fitting part, and wherein heat generated from said light emitting diodes and conducted to said heat dissipating plates is transmitted to heat dissipating means by a heat pipe assembled in said heat pipe fitting part in close contact with the inner wall thereof.

3. The backlight device according to claim 1 wherein a dust-proofing elastic member is bonded to said reflective plate supports of each heat radiating plate on each side for sealing a lateral opening of said substrate fitting part.

4. The backlight device according to claim 1 wherein each guide opening formed in said reflective plate in association with each light emitting array is formed by a a plurality of groups of guide openings arranged on the same coaxial line, with each said group being separated from a neighboring group by a bridge, with each of said groups being of a length allowing a plurality of said light emitting diodes to pass therethrough, and wherein, as said reflecting plate is bonded to said reflective plate supports of each heat radiating plate, said bridge thrusts said reflective sheet pieces towards said heat radiating plate to hold said reflective sheet pieces.

5. The backlight device according to claim 1 wherein reflective sheet pieces are formed of an insulating polymer material, said reflecting plate is formed of aluminum as base material, an opening edge of each guide through-hole in said reflective sheet piece is protruded inwards from an opening edge of each guide opening of said reflective sheet piece in a manner of maintaining electrical insulation between said opening edge of each guide opening and a terminal part of each light emitting diode or a terminal part of an interconnection substrate.

6. A liquid crystal display apparatus comprising a light transmitting liquid crystal panel;

a backlight section including a plurality of light emitting arrays arranged at equal intervals on one surface of an interconnection substrate, each light emitting array being composed of a plurality of light emitting units made up of a plurality of light emitting diodes mounted on the same co-axial line, said backlight section sending out light radiated from said light emitting diodes towards said liquid crystal panel as illuminating light;

an optical converting section arranged between said liquid crystal panel and said backlight section, and formed by a laminate of a plurality of functional optical sheets for processing said illuminating light supplied from said backlight section with preset optical conversion to send the so converted illuminating light to said liquid crystal panel;

a light conducting section including a light diffusing light guide plate for diffusing said illuminating light to send the so diffused light to said liquid crystal panel and a light diffusing plate for performing light reflection/diffusion and light transmission on said illuminated light for equalizing the brightness to supply the resulting illuminating light to said diffusing light guide plate;

a reflecting section for reflecting said light radiated from said light emitting diodes of said backlight section to the surrounding and said illuminating light reflected by said light diffusing plate towards said light conducting section; and a heat radiating section having a heat radiating plate formed of a metal material having heat conductivity in which a major surface of the heat radiating plate base is formed with a substrate fitting part for carrying said interconnection substrates side-by-side on the same co-axial line in the lengthwise direction and in which said substrate fitting part is formed as one with reflective plate supports along the lateral sides of said substrate fitting part; and a reflecting plate including a plurality of reflective sheet pieces and a reflecting plate, said reflective sheet pieces each being formed from a sheet with reflecting properties to the shape of a rectangle having a length corresponding to a preset number of said light emitting diodes and a width smaller than the width of said heat radiating plate, said reflective sheet pieces each being provided with a large number of guide through-holes on the same axial line, through which are passed the light emitting pars of said light emitting diodes, said reflecting plate being formed by a plate member formed to an outer shape approximately equal to that of said liquid crystal panel, said reflecting plate having a plurality of rows of guide through-holes through which are passed light emitting parts of said light emitting diodes, said rows being each registering with said light emitting arrays;

said reflecting sheet pieces being mounted from one light emitting unit to another as said light emitting parts of said light emitting diodes are protruded through said guide through-holes facing the light emitting parts;

said reflecting plate being superposed on said reflective sheet pieces and bonded to said reflective plate supports of each heat radiating plate as said light emitting diodes protruded from said guide through-holes are protruded through said guide openings.

7. The liquid crystal display apparatus according to claim 6 wherein said heat dissipating section is made up by each of said heat radiating plates and a heat pipe assembled in a heat pipe fitting part, formed over the entire area along the length of said bottom surface of said base of said heat dissipating plate formed with said substrate fitting part, over the entire length of said bottom surface, as said heat pipe is in tight contact with the inner wall of said heat pipe fitting part, said heat dissipating section transmitting the heat evolved in each light emitting diode to each of said heat radiating plates and transmitting said heat by said heat pipe to heat radiating means.

8. The liquid crystal display apparatus according to claim 6 wherein each guide opening formed in said reflective plate in association with each light emitting array in said reflecting plate is formed by a plurality of groups of guide openings arranged on the same coaxial line, with each group of guide openings being separated from a neighboring group by a bridge for allowing a plurality of said light emitting diodes to pass therethrough, and wherein, as said reflecting plate is bonded to said reflecting plate supports of each heat radiating plate, said bridge thrusts said reflective sheet pieces towards said heat radiating plate to hold said reflective sheet pieces.

9. The liquid crystal display apparatus according to claim 6 wherein reflective sheet pieces are formed of an insulating polymer material, said reflecting plate is formed of aluminum as base material, an opening edge of each guide through-hole in said reflective sheet piece is protruded inwards from an opening edge of each guide opening of said reflective plate in a manner of maintaining electrical insulation between an opening edge of each guide opening and a terminal part of each light emitting diode or a terminal part of an interconnection substrate.

* * * * *